L. R. McDONALD.
CONSTANT AMPLITUDE OF VIBRATION MOTOR AND METHOD OF CONTROLLING SAME.
APPLICATION FILED DEC. 28, 1916.
1,290,264.
Patented Jan. 7, 1919.
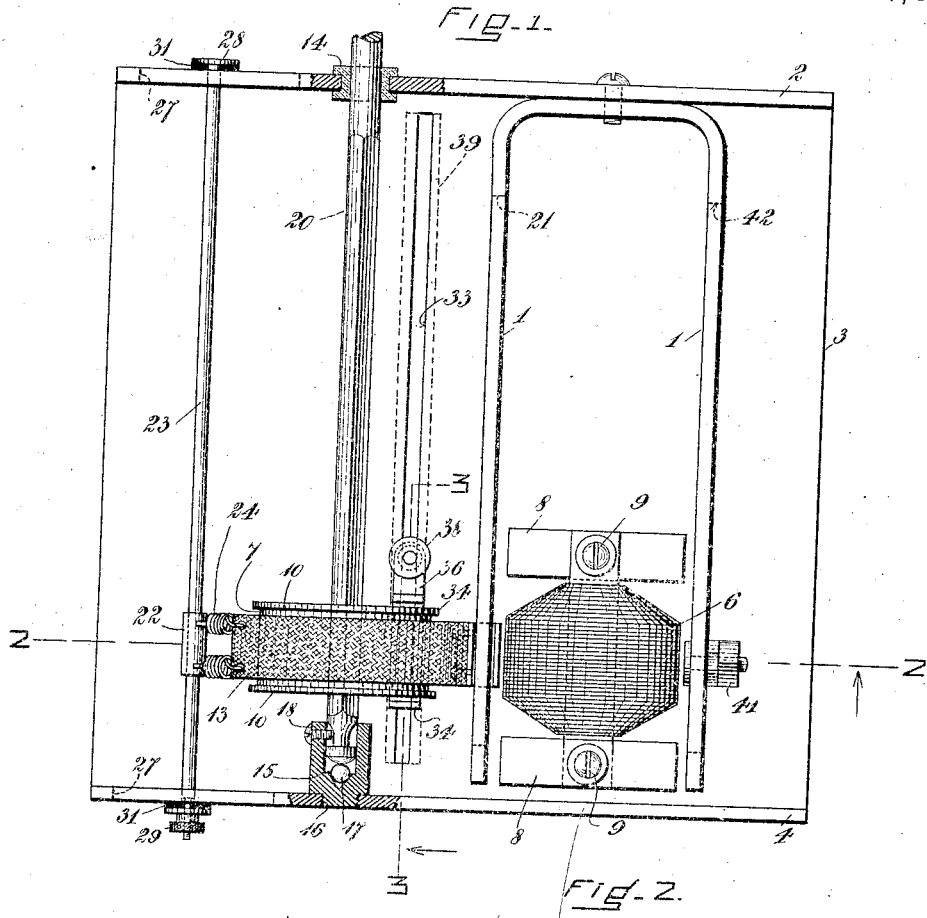

UNITED STATES PATENT OFFICE.

LESLIE R. McDONALD, OF MONTREAL, QUEBEC, CANADA, ASSIGNOR TO MARGUERITE G. O'LEARY, OF MONTREAL, QUEBEC, CANADA.

CONSTANT-AMPLITUDE-OF-VIBRATION MOTOR AND METHOD OF CONTROLLING SAME.

1,290,264.	Specification of Letters Patent.	Patented Jan. 7, 1919.

Application filed December 28, 1916. Serial No. 139,332.

*To all whom it may concern:*

Be it known that I, LESLIE R. McDONALD, a citizen of the United States, and resident of Montreal, in the Province of Quebec and Dominion of Canada, have invented new and useful Improvements in Constant-Amplitude-of-Vibration Motors and Methods of Controlling Same, of which the following is a specification.

This invention relates to a motor comprising one or more vibratory members and to the method of and means for regulating the speed of a motor of this type. More particularly, the invention relates to an electric motor comprising a rotary member, a vibratory member, a tensioned belt connecting with the vibratory member and contacting with the periphery of the rotary member so as continuously to rotate the rotary member as the belt is moved back and forth by the vibratory member, and means to produce a regularly varying magnetic field having a frequency of variation substantially equal to the natural frequency of vibration of the vibratory member.

A motor of this character is simple, durable and highly efficient. It is adapted to produce a large torque at a relatively low angle velocity and is adapted to be operated by vibratory current, such as for example, the ordinary commercial current alternating at sixty cycles per second. Such a motor is particularly useful for operating phonographs, advertising devices, display tables, sign-flashers and the like, where it is desirable to employ commercial alternating current to drive the apparatus at comparatively low speed. The motor obviates the usual transmission mechanism for transforming high velocity rotation into low velocity rotation, the low velocity rotation being produced directly and far more efficiently.

The principal object of the invention is to control the angular velocity of the driven member of the motor by varying the driving effect of the belt and vibratory member without substantially changing either the rate or amplitude of vibration of the vibratory member, for example, by varying the tension of the belt, by varying the angle of contact between the belt and the rotary member, and by varying the point of connection between the belt and the vibratory member, etc. Another object is to so associate the plurality of means for controlling the motor speed in the aforesaid manner that the means may be employed conjointly or separately, simultaneously or successively, thereby to regulate the speed of the motor either roughly and minutely and through a considerably wider range than is possible with a single means. Another object, where the vibratory members are arranged in the form of a tuning fork, is to drive the rotary member with one vibratory member and to regulate the angular velocity of the rotary member with the other vibratory member, as for example, by varying the effective weight of the other vibratory member.

Other objects of the invention will be apparent from the following description and the accompanying drawings, in which,—

Figure 1 is a plan view of the apparatus, parts being shown in section;

Fig. 2 is a vertical transverse section on the line 2—2 of Fig. 1;

Fig. 3 is a vertical longitudinal section taken on line 3—3 of Fig. 1, parts being omitted.

The particular embodiment of the invention herein illustrated comprises vibratory members 1 arranged in the form of a tuning fork and mounted on one upturned end 2 of the U-shaped supporting member 3 having a second upturned end 4, an electromagnet 6 for vibrating members 1, and a rotary member 7 mounted on the shaft 20 which is intended to be connected to the apparatus to be driven by the motor.

The electromagnet 6 comprising a field coil and laminated pole pieces 8, is mounted on the member 3 with the faces of the pole pieces disposed in planes parallel with but slightly displaced from the vibratory members 1. The means for supporting the electromagnet comprises machine screws 9 which pass through the pole pieces and are threaded into the openings 11 in the supporting member 3, two tubular spacing members 12 being disposed around the machine screws between the pole pieces and the supporting member to position the electromagnet with relation to the vibratory members.

The rotary member 7 is in the form of a cylinder of considerable thickness so that the member not only serves as a pulley, but also serves to some extent as a fly wheel. The pulley is provided with peripheral flanges 10 at each end, these flanges extending outwardly somewhat beyond the face of the pulley to serve as guides for the belt 13. The pulley is slidingly mounted on the shaft 20 for a purpose hereinafter to be described and it is keyed to the shaft, as for example, by employing a shaft having a square cross section. The shaft 20 is mounted in parallelism with the vibratory members 1 in the ends 2 and 4 of the support 3. Suitable means for this purpose comprises a bearing 14 and a bearing 15, the bearing 15 being threaded into an opening 16 in member 4 and being provided with a conical recess adapted to receive the ball bearing 17 and also being provided with a set screw 18 extending through the bearing. The end of shaft 20 is provided with a rounded end coöperating with the ball bearing 17 and also with an annular recess coöperating with the set screw 18 to prevent the shaft being withdrawn from the bearing 15.

The belt 13 is connected at one end to the member 19 which is slidingly mounted in the longitudinal slot 21 extending almost the full length of the left vibratory member 1. At its other end the belt is connected to a tubular member 22 slidingly mounted on the rod 23, springs 24 being inserted between the end of the belt and the sleeve 22 so as to tension the belt and cause it to bear against a portion of the periphery of the pulley 7. The springs 24 are preferably arranged so that they can readily be detached from the member 22 and belt 23 so that springs of different tensioning power may be readily inserted to vary the tension on the belt. A cylinder of felt or felt-like material 26 fitting snugly within each of the coil springs, as illustrated in Fig. 2, is preferably provided in order to largely reduce, if not entirely eliminate, the noise produced by the expansion and contraction of the springs.

The shaft 23 upon which the sleeve 22 is mounted is preferably arranged to extend through arcuate slots 27 in the end members 2 and 4, these slots preferably being either exactly or approximately in the form of involutes so arranged with respect to the shaft 20 that the tension on the belt is little, if any, varied by moving the shaft 23 along the slots. On one end the shaft 23 is provided with a head 28 and on the other end with a thumb nut 29 threaded on to the shaft in such manner that the rod 23 may be secured in any position along the slots. Washers 31 of hard rubber or other suitable material are preferably provided between the frame and the head 28 and nut 29, respectively, and the head 28 and nut 29 are preferably given considerable diameters so that the rod 23 can more easily be maintained in parallelism with the shaft 20 as it is adjusted along the slots 27.

A U-shaped member 32 is adjustably mounted in the slot 33 which extends longitudinally of the frame in proximity to the shaft 20. The two arms 34 of the U-shaped member 32 extend upwardly on opposite sides of the pulley 7 in such manner as to engage either end of the pulley and slide it along the shaft. The U-shaped member 32 is provided with an extension 36 having an opening therein through which extends the bolt 37, a thumb nut 38 being provided to coöperate with the bolt 37 and clamp the U-shaped member in adjusted position. The head of the bolt 37 is arranged to slide in a slot 39 so that it does not extend beneath the bottom of the frame 3.

The operation of the apparatus is as follows: When a vibratory current, either a pulsatory direct current or an alternating current, of a certain frequency, for example 60 cycles per second, is caused to flow through the field coil 6, the vibratory members 1 are vibrated to and fro in synchronism with the vibratory current, the vibratory members being so designed that they have a natural frequency of vibration substantially equal to the frequency of variation of the vibratory current. As the vibratory members 1 move together the belt 13 is reciprocated to the right, and owing to the fact that the belt is held in frictional engagement with the pulley by means of springs 24 this motion of the belt causes the pulley to rotate in the direction of the arrow. As the vibratory members move apart, the tension on the right end of the belt is released and the springs move the belt in the opposite direction. The springs are so tensioned however that they do not pull the belt as rapidly as the opposite end of the belt is released by the vibratory members moving apart. Thus, the belt is not drawn tightly against the pulley as it is reciprocated to the left by the springs, but on the contrary it slides over the smooth surface of the pulley and there is comparatively little tendency to produce rotation of the pulley in the direction opposite to the arrow. In other words, the members 1 vibrating at a frequency of 120 cycles per second for example, move apart so rapidly that the tension on the belt is released more quickly than it can be taken up by the relatively slow acting springs, and the pressure between the belt and the pulley is therefore negligible while the springs are moving the belt into retracted position. However, the springs are so tensioned that the time lag is very slight and as the vibratory members reverse their direction of movement, the springs tension the belt so that it is again advanced under tension as the vibratory members move together, thereby imparting another impulse to the rotary member in the direction of the arrow. Inasmuch as these impulses occur at a frequency of 120 cycles per second, when using ordinary sixty-cycle current, and inasmuch as the pulley has considerable inertia the rotary portion of the apparatus may be caused to rotate at substantially uniform velocity.

In the embodiment of the invention herein illustrated the angular velocity of the rotary member may be varied in any one of a number of ways. The velocity may be varied by interchanging springs 24 with springs of greater or less tensioning power, the angular velocity of the rotary member varying directly with the tension of the spring, and this means I preferably employ to change the speed by relatively large steps.

Another method of controlling the speed comprises varying the angle of contact between the belt and the pulley by adjusting the shaft 23 along the involute slots 27. While the torque applied to the pulley by the belt varies directly with the angle of contact between the belt and the pulley, the angular velocity of the pulley varies inversely with the angle of contact. In this connection it is to be noted that the magnitude of the angle of contact is governed in part by the character of the belt material. For example, if a heavy leather belt is used the angle of contact may be only about 90° to 120°, while when using a comparatively light belt, as for example a thin linen strip, the angle of contact may be made 720° or more, that is, the belt may be made to encircle the pulley one or more times, in which case the pulley is made of greater length so that the belt can be wound thereon in the form of a spiral.

Another method of varying the angular velocity of the rotary member comprises shifting the rotary member and belt along the shaft 20, the connections between the belt and the rod 23 and vibratory member 1, respectively, being such that when the pulley is reciprocated by means of the U-shaped member 32 the belt and connecting means follow along with it. The angular velocity of the rotary member increases as it is moved toward the free end of the vibratory member inasmuch as this end of the vibratory member vibrates through a larger arc than other portions of the member. This particular method of speed control is particularly effective, it being possible to vary the angular velocity of the rotary member from a magnitude of the order of 100 R. P. M. to the magnitude of the order of one-half R. P. M. by this method alone, and when using only a single means of speed control this is my preferred means in a motor of this character where the angular velocity of the rotary member is varied without varying either the rate or magnitude of vibration of the vibratory member. However, I prefer to associate together a plurality of means of speed control in a manner the same or similar to that herein disclosed so as not only to obtain a far greater latitude of speed control, but also so that one means may be employed to effect large changes of speed, and another means may be employed to secure finer gradations of speed control.

And a still further method of speed control in apparatus having the vibratory members arranged in the form of a tuning fork, involves driving the rotary member by means of one of the vibratory members and varying the effective weight of the other vibratory member, inasmuch as the two parts of the tuning fork vibrate in synchronism, even though the effective weights of the two members differ somewhat in magnitude. A suitable means for varying the effective weight of the idle prong of the tuning fork comprises a weight 41 adjustable along the slot 42 in the right vibratory member. The effective weight of the member may be varied either by interchanging the weight 41 with weights of greater or less mass, or by longitudinally varying the position of the weight in the slot 42. The angular velocity of the rotary member varies directly with the magnitude of the weight of the vibratory members up to the point where the weight is just large enough to give the vibratory members a period of vibration equal to the period of the pulsating or alternating magnetic field, or other impelling forces, and above this point the angular velocity varies uniformly as the magnitude of the weight, the effect of moving the weight toward the free end of the vibratory member being the same as increasing the magnitude of the weight.

The term "continuously rotating" has been employed throughout the specification and claims particularly to signify that the rotation of the driven member is continuously in the same direction, although in fact the rotation is also continuous in the sense that it is unbroken. Furthermore, the rotation can be made substantially constant in velocity as well as continuous.

This application is in part a continuation of that applied for June 16, 1916, under Sr. No. 104,095, as is also those applied for on even date herewith, under Sr. No. 139,333, Sr. No. 139,334, and Sr. No. 139,448; and I hereby make reference to these applications for the disclosure of modifications of certain phases of this invention, particularly with respect to the construction of the tuning fork vibratory members, the disposition of the rotary member and field coil, respectively, with relation to the vibratory member, the particular means of attaching the belt to the vibratory member, discussion of the theory of operation of apparatus of this character, etc.

Furthermore, the methods outlined above may be carried out in other ways than those briefly described, for example, instead of moving the fixed end of the belt along the path of an involute it may be moved along a path differing somewhat from that of an involute so that the tension of the belt is varied either directly or inversely with the variation in angle of contact between the belt and the rotary member. And the tension of the belt may be controlled in other ways, as for example, by varying the position either of the vibratory members or of the shaft carrying the rotary member, or by employing a turn buckle between the springs and the belt. Moreover, the springs may be entirely dispensed with by employing a belt which is elastic throughout its entire length or throughout that portion adjacent the fixed end thereof.

Such term as "frequency of variation," with reference to the vibratory current for example, means the number of complete cycles of variation of pulsatory direct current occurring per unit of time or the number of half cycles of rotation of alternating current occurring per unit of time, the alternating current having two alternations per complete cycle.

I claim:

1. In a motor comprising a rotary driven member and a vibratory driving member, the method of regulating the angular velocity of the driven member comprising varying the speed ratio between the rotary member and the vibratory member while maintaining substantially constant both the rate of vibration and the amplitude of vibration of the vibratory member.

2. In a motor comprising a rotary driven member, a vibratory driving member, a tensioned belt contacting with the periphery of the rotary member and connecting with the vibratory member so as to be reciprocated thereby, the method of regulating the angular velocity of the rotary member comprising varying the angle of contact between the belt and the rotary member, varying the point of connection between the belt and the vibratory member, and varying the tension of the belt.

3. In a motor comprising a rotary driven member, a vibratory driving member, a tensioned belt contacting with the periphery of the rotary member and connecting with the vibratory member so as to be reciprocated thereby, the method of regulating the angular velocity of the rotary member comprising varying the angle of contact between the belt and the rotary member.

4. In a motor comprising a rotary driven member, a vibratory driving member, a tensioned belt contacting with the periphery of the rotary member and connecting with the vibratory member so as to be reciprocated thereby, the method of regulating the angular velocity of the rotary member comprising varying the point of connection between the belt and the vibratory member.

5. In a motor comprising a rotary driven member, a vibratory driving member, a tensioned belt contacting with the periphery of the rotary member and connecting with the vibratory member so as to be reciprocated thereby, the method of regulating the angular velocity of the rotary member comprising varying the tension of the belt.

6. In a motor comprising a rotary member, vibratory members in the form of a tuning fork, and means for causing one vibratory member to rotate the rotary member, the method of regulating the angular velocity of the rotary member comprising varying the effective weight of the other vibratory member.

7. Motor apparatus comprising a rotary member, a vibratory member, driving means attached to the vibratory member for continuously rotating the rotary member, and regulating means directly operative upon the driving means for varying the angular velocity of the rotary member.

8. Motor apparatus comprising a rotary member, a vibratory member, a tensioned belt attached to the vibratory member and arranged to contact with at least a portion of the periphery of the rotary member so as continuously to rotate the rotary member when the vibratory member vibrates, and means for varying the driving effect of the belt while maintaining substantially constant both the rate and amplitude of vibration of the vibratory member, thereby to control the angular velocity of the rotary member.

9. Motor apparatus comprising a rotary member, a vibratory member, a tensioned belt connecting with the vibratory member and contacting with the periphery of the rotary member so as continuously to rotate the rotary member when the vibratory member vibrates, means for varying the tension of the belt, means for varying the angle of contact between the belt and the rotary member and means for varying along the vibratory member the point of contact between the belt and the vibratory member, whereby the angular velocity of the rotary member may be accurately regulated.

10. Motor apparatus comprising a rotary member, a vibratory member, a tensioned belt connecting with the vibratory member and contacting with the periphery of the rotary member so as continuoulsy to rotate the rotary member when the vibratory member vibrates, and means for varying the tension of the belt, thereby regulating the angular velocity of the rotary member while maintaining substantially constant both the rate and amplitude of vibration of the vibratory member.

11. Motor apparatus comprising a rotary member, a vibratory member, a tensioned belt connecting with the vibratory member and contacting with the periphery of the rotary member so as continuously to rotate the rotary member when the vibratory member vibrates, and means for varying the angle of contact between the belt and the rotary member, thereby regulating the angular velocity of the rotary member while maintaining substantially constant both the rate and amplitude of vibration of the vibratory member.

12. Motor apparatus comprising a rotary member, a vibratory member, a tensioned belt connecting with the vibratory member and contacting with the periphery of the rotary member so as continuously to rotate the rotary member when the vibratory member vibrates, and means for varying along the vibratory member the point of contact between the belt and the vibratory member.

13. Motor apparatus comprising a rotary member, a vibratory member, a support, a belt connecting at its opposite ends with the vibratory member and the support, respectively, and contacting intermediate its ends with the periphery of the rotary member so as continuously to rotate the rotary member when the vibratory member vibrates, the belt comprising an elastic portion for normally tensioning the belt and maintaining it in contact with the rotary member, and means whereby the support may be adjusted substantially along the path of an involute to vary the angle of contact between the belt and the rotary member.

14. Motor apparatus comprising a vibratory member, a shaft mounted substantially in parallelism with the vibratory member, a pulley mounted on the shaft, the pulley being movable longitudinally of the vibratory member, a supporting member substantially parallel with the vibratory member, a belt, and means for connecting the belt to said members, respectively, so that the belt contacts with the periphery of the pulley therebetween, the connecting means being adjustable along said members whereby the angular velocity of the pulley may be varied by moving the belt and pulley longitudinally along the vibratory member.

15. Motor apparatus comprising a vibratory member, a shaft mounted substantially in parallelism with the vibratory member, a pulley keyed to the shaft and slidable therealong, a supporting member substantially parallel with the vibratory member, a belt contacting with the periphery of the pulley, and means slidable along said member for connecting the ends of the belt to said members, respectively, so that the pulley and belt together may be reciprocated longitudinally along the vibratory member, thereby to vary the angular velocity of the pulley.

16. Motor apparatus comprising a vibratory member, a shaft mounted substantially in parallelism with the vibratory member, a pulley keyed to the shaft and slidable therealong, a supporting member substantially parallel with the vibratory member, a belt contacting with the periphery of the pulley, means slidable along said members for connecting the ends of the belt to said members, respectively, and means engaging the pulley for longitudinally adjusting the pulley, belt and connecting means longitudinally along the vibratory member, thereby to vary the angular velocity of the pulley.

17. The combination with a rotatable member, and a flexible, reciprocably mounted cord in frictional engagement therewith; of means to oscillate said cord upon said member to cause continuous rotation of the same; and means to alter the speed of rotation of said member.

Signed by me at Montreal, Canada, this first day of December, 1916.

LESLIE R. McDONALD.